United States Patent
Manley et al.

(10) Patent No.: US 7,051,240 B2
(45) Date of Patent: May 23, 2006

(54) DIAGNOSIS OF DATA PACKET TRANSFER FAULTS USING CONSTRAINTS

(75) Inventors: Douglas R. Manley, Fort Collins, CO (US); Lee A. Barford, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 454 days.

(21) Appl. No.: 10/099,335

(22) Filed: Mar. 14, 2002

(65) Prior Publication Data

US 2003/0177416 A1    Sep. 18, 2003

(51) Int. Cl.
G06F 11/00 (2006.01)

(52) U.S. Cl. .......................................... 714/43; 714/37
(58) Field of Classification Search ................ 714/43, 714/56, 37, 741
See application file for complete search history.

(56) References Cited

U.S. PATENT DOCUMENTS

| | | | | |
|---|---|---|---|---|
| 4,745,593 A | * | 5/1988 | Stewart | ...................... 370/244 |
| 5,226,111 A | | 7/1993 | Black et al. | |
| 5,668,800 A | * | 9/1997 | Stevenson | .................... 370/248 |
| 5,684,807 A | * | 11/1997 | Bianchini et al. | ........... 714/712 |
| 5,808,919 A | | 9/1998 | Preist et al. | |
| 5,922,079 A | | 7/1999 | Booth et al. | |
| 5,946,482 A | | 8/1999 | Barford et al. | |
| 6,167,352 A | | 12/2000 | Kanevsky et al. | |
| 6,247,154 B1 | * | 6/2001 | Bushnell et al. | ............. 714/733 |
| 6,249,755 B1 | * | 6/2001 | Yemini et al. | .............. 702/183 |
| 6,327,545 B1 | | 12/2001 | Browen et al. | |
| 6,587,960 B1 | * | 7/2003 | Barford et al. | ................. 714/8 |
| 6,904,544 B1 | * | 6/2005 | DeRolf et al. | ................ 714/43 |
| 2002/0178401 A1 | * | 11/2002 | Ball et al. | ..................... 714/38 |

OTHER PUBLICATIONS

Manley, et al., "Diagnosis of Transfer Faults Using Constraints," U.S. Appl. No. 10/078,817, filed Feb. 19, 2002.

* cited by examiner

*Primary Examiner*—Scott Baderman
*Assistant Examiner*—Paul F. Contino

(57) ABSTRACT

Method for diagnosing data packet transfer faults in a system under test (SUT) are provided. A representative method includes: identifying at least some portions of the data transmission paths of the SUT capable of introducing errors in data packet transfer; providing constraints defining data packet transfer relationships of at least some of the portions of the data transmission paths; and diagnosing the SUT with respect to the constraints. Systems, computer-readable media and other methods also are provided.

23 Claims, 5 Drawing Sheets

DIAGNOSIS OF DATA PACKET TRANSFER FAULTS USING CONSTRAINTS

FIELD OF THE INVENTION

The present invention generally relates to system fault diagnosis. In particular, the present invention relates to systems and methods that involve the diagnosis of faults in multiple discrete data transfers between portions of a system.

DESCRIPTION OF THE RELATED ART

Various systems and methods have been used for diagnosing faults exhibited by systems under test (SUTs). By way of example, manual diagnosis, automated diagnosis based on test model-based technology, custom software and fault simulation have been used. These techniques, however, tend to exhibit one or more perceived shortcomings that may tend to limit their applicability.

In regard to manual diagnosis, this technique typically is a knowledge-intensive technique that requires a high level of SUT and test suite knowledge. Acquisition of such knowledge by an operator can be time consuming and, therefore, expensive. Additionally, results obtained during diagnosis typically are not repeatable, in that results can vary from operator to operator and/or location to location. Such a technique also can be somewhat error prone, in that improper application of the technique may result in inaccurate fault diagnosis.

Many forms of test model-based diagnosis, while considered competent for diagnosing static faults, tend to be ineffective for use in diagnosing intermittent faults. A static fault is a fault that is present during an entire test and typically affects all data transfers during the test, whereas an intermittent fault typically only affects some of the data transfers. Test model-based techniques tend to indict an entire test path when a fault is diagnosed in relation to that test path, compared to indicting a particular portion(s)and/or component(s) of the test path. Additionally, test model-based diagnosis typically requires the development of a detailed model of the tests for a system. Example of test model-based systems are disclosed in U.S. Pat. No. 5,808,919, issued to Preist, et al., which is incorporated herein by reference, and which is commonly assigned with this disclosure to Agilent Technologies, Inc.

Custom software also has been used to diagnose systems. Unfortunately, custom software typically is written to diagnose only a specific system. This approach tends to be cumbersome and, therefore, expensive to implement.

As is also known, fault simulators can be used in system diagnosis. Fault simulators typically operate by producing a fault dictionary. Fault simulation, however, typically requires a large amount of modeling time and relatively large execution times, particularly when complex circuits are employed by the SUT. This is because simulation typically involves a bit-by-bit analysis of SUT operation. Because of this, fault simulation typically is not deemed practical for use in complex commercial applications. Additionally, fault simulation is non-existent or, otherwise, considered impractical for diagnosis of intermittent failures.

Based on the foregoing, it should be appreciated that there is a need for improved systems and methods that address the aforementioned and/or other perceived shortcomings of the prior art.

SUMMARY OF THE INVENTION

The present invention relates to the diagnosis of faults in data packet transfers of a system under test (SUT). Typically, the invention uses constraints to define data packet transfer relationships among various portions of the SUT. These constraints then can be evaluated with respect to test results obtained from the SUT.

In some embodiments, a dataflow model is used to identify those portions of an SUT capable of introducing data packet transfer errors. Constraints then are developed to define the data packet transfer relationships among the portions identified. Thus, when test results corresponding to the SUT are received and a data packet transfer error(s) is detected, the constraints can be evaluated with respect to the test results using the dataflow model to potentially identify and/or exonerate components and/or subcomponents of the SUT that could have produced the data packet transfer error(s).

Various techniques can be used to determine a diagnosis. By way of example, linear programming, such as Integer programming, rules-based edge classification and/or flow event-based edge classification can be used.

In some embodiments, those portions of an SUT capable of counting data, e.g., data packets, and/or capable of performing an operation with respect to the data also can be identified. For instance, such an operation could include replicating (bussing), splitting, combining, dropping and/or routing (switching) data.

In this regard, embodiments of the invention may be construed as methods for diagnosing data packet transfer faults in an SUT. In particular, one such method includes: identifying at least some portions of the data transmission paths of the SUT capable of introducing errors in data packet transfer; providing constraints defining data packet transfer relationships of at least some of the portions of the data transmission paths; and diagnosing the SUT with respect to the constraints.

Embodiments of the invention also may be construed as systems for diagnosing data packet transfer faults in a system under test (SUT). One such system includes a dataflow model and a reasoning engine. The dataflow model is representative of data transfer capabilities of the SUT. The reasoning engine is adapted to evaluate test results corresponding to the SUT in relation to the dataflow model.

Another system for diagnosing faults incorporates means for receiving test results corresponding to transfers of data packets through at least some portions of the data transmission paths of the SUT and means for diagnosing the SUT with respect to constraints defining data packet transfer relationships of at least some of the portions of the data transmission paths of the SUT.

Still other embodiments of the invention may be construed as diagnosis systems, at least some of which can be stored on computer-readable media. One such diagnosis system includes logic configured to identify at least some portions of the data transmission paths of the SUT capable of introducing errors in data packet transfer; logic configured to provide constraints defining data packet transfer relationships of at least some of the portions of the data transmission paths; and logic configured to diagnose the SUT with respect to the constraints.

Clearly, embodiments of the invention may exhibit features and/or advantages in addition to, or in lieu of, those set forth above. Additionally, other systems, methods, features and/or advantages of the present invention will be or may become apparent to one with skill in the art upon examination of the following drawings and detailed description. It is intended that all such additional systems, methods, features and/or advantages be included within this description, be within the scope of the present invention, and be protected by the accompanying claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

As will be described in greater detail herein, systems and methods of the present invention potentially enable fault diagnoses of systems under test (SUT) that are associated with the transfer of data. In particular, constraints representative of relationships between various portions of data transmission paths of an SUT can be used to infer and/or exonerate fault candidates or portions of the SUT potentially responsible for the detected faults. The constraints defining the dataflow functionality of the SUT can be used to derive rules and/or equations, for example, that describe how data is to flow through the SUT. Typically, a dataflow model representative of the error-free, data packet transfer behavior of the SUT is used. In such an embodiment, the SUT can be diagnosed using the dataflow model and an associated reasoning engine. In some embodiments, the faults diagnosed can occur in the SUT at-speed and/or can be intermittent.

Figure 1:
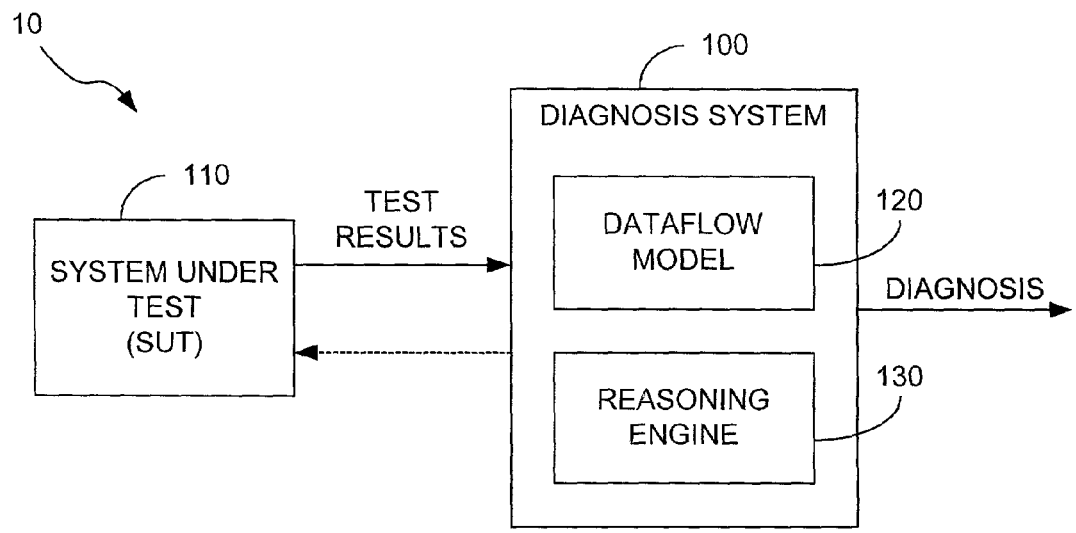
FIG. 1 is a schematic diagram depicting an embodiment of a system of the present invention that includes an embodiment of a diagnosis system being employed to test a system under test.

Referring now to the drawings, wherein like reference numerals indicate corresponding components throughout the several views, FIG. 1 is a schematic diagram depicting an embodiment of a system 10 of the present invention. More specifically, system 10 includes a diagnosis system 100 that communicates with an SUT 110. Diagnosis system 100 incorporates a dataflow model 120 and a reasoning engine 130. The dataflow model 120 describes the flow(s) of data associated with SUT 110 and the reasoning engine 130 interprets test results relative to the dataflow model as will be described in detail later. Preferably, an output diagnosis of the diagnosis system 100 includes an indication of a component(s) and/or subcomponent(s), the failure of which could have resulted in the observed test results.

In some embodiments, the diagnosis system may communicate indirectly with the SUT. For instance, the SUT could provide information, e.g., test results, to another system or program, with the information then being provided to the diagnosis system for analysis.

Figure 2:
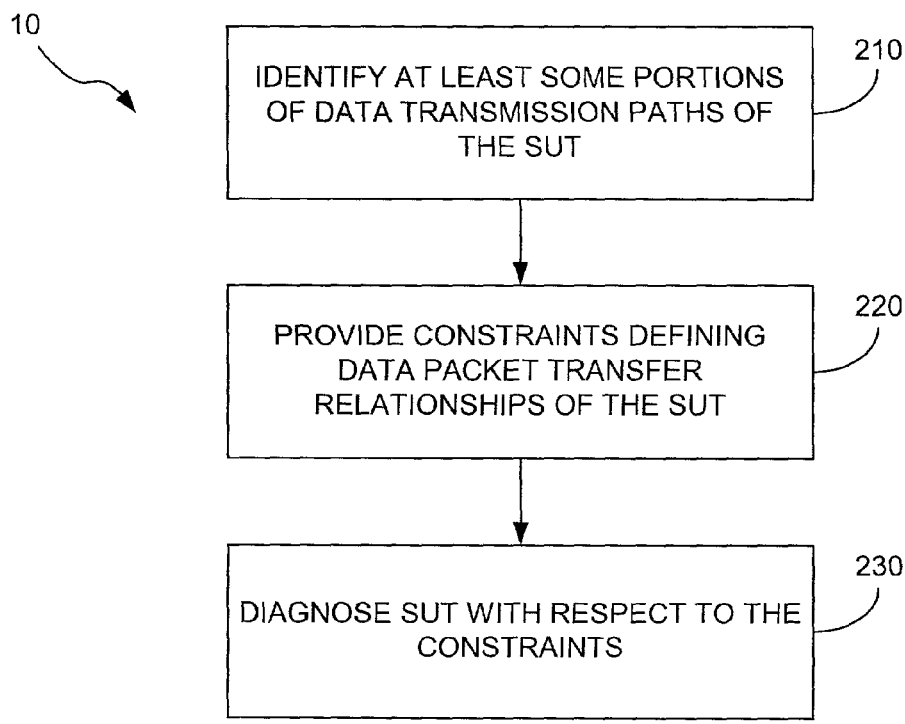
FIG. 2 is a flowchart depicting functionality of an embodiment of the diagnosis system of the present invention.

A flowchart depicting functionality of an embodiment of system 10 of the present invention is depicted in FIG. 2. As shown in FIG. 2, system or method 10 may be construed as beginning at block 210, where at least some portions of data transmission paths of an SUT are identified. More specifically, the identified portions of the SUT can be capable of introducing errors in data transfer. In block 220, constraints defining data packet transfer relationships of at least some of the portions of the data transmission paths are provided. Thereafter, such as depicted in block 230, the SUT is diagnosed with respect to the constraints.

Diagnosis systems 100 can be implemented in software, firmware, hardware, or a combination thereof. When implemented in hardware, diagnosis system 100 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

When implemented in software, diagnosis system 100 can be a program that is executable by a computer or processor-based device. An example of such a computer or processor-based device will now be described with reference to the schematic diagram of FIG. 3.

Figure 3:
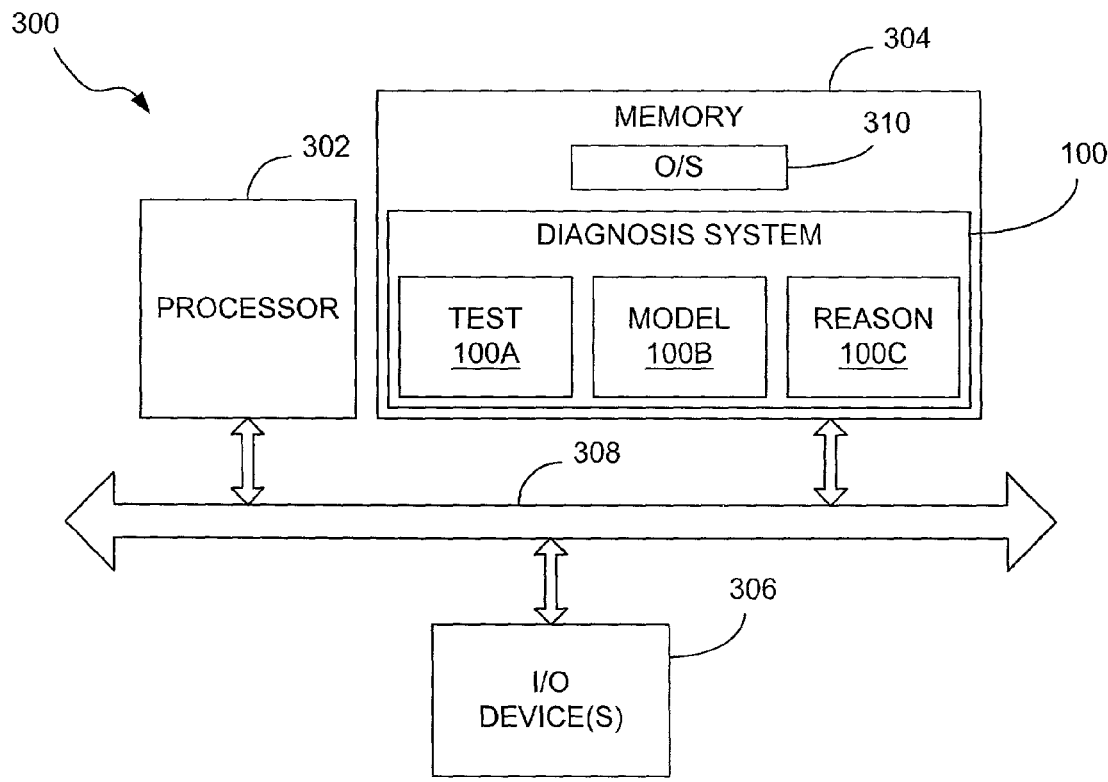
FIG. 3 is a computer or processor-based system that can be used to implement an embodiment of the diagnosis system of the present invention.

Generally, in terms of hardware architecture, computer 300 of FIG. 3 includes a processor 302, memory 304, and one or more input and/or output (I/O) devices 306 (or peripherals) that are communicatively coupled via a local interface 308. Local interface 308 can be, for example, one or more buses or other wired or wireless connections, as is known in the art. Local interface 308 can include additional elements, which are omitted for ease of description. These additional elements can be controllers, buffers (caches), drivers, repeaters, and/or receivers, for example. Further, the local interface may include address, control, and/or data connections to enable appropriate communications among the components of computer 300.

Processor 302 can be a hardware device configured to execute software that can be stored in memory 304. Processor 302 can be any custom made or commercially available processor, a central processing unit (CPU) or an auxiliary processor among several processors. Additionally, the processor can be a semiconductor-based microprocessor (in the form of a microchip), for example.

Memory 304 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 504 can incorporate electronic, magnetic, optical, and/or other types of storage media. Note that memory 304 can have a distributed architecture, where various components are situated remote from one another, but can be accessed by processor 302.

The software in memory 304 can include one or more separate programs, each of which comprises an ordered listing of executable instructions for implementing logical functions. The software in the memory 304 includes diagnosis system 100 and a suitable operating system (O/S) 310. Note, diagnosis system may exhibit one or more of various functions, such as testing 100A, modeling 100B and reasoning 100C, which will be described later. In some embodiments, one or more of these functions may be provided as separate programs. The operating system 310 controls the execution of other computer programs, such as diagnosis system 100. Operating system 310 also can provide scheduling, input-output control, file and data management, memory management, and communication control and related services.

The I/O device(s) 306 can include input devices, such as a keypad, for example. I/O device(s) 306 also can include output devices, such as a display device, for example. I/O device(s) 306 may further include devices that are configured to communicate both inputs and outputs, such as a communication port, for example.

When the computer 300 is in operation, processor 302 is configured to execute software stored within the memory 304, communicate data to and from the memory 304, and generally control operations of the computer. Diagnosis system 100 and the O/S 310, in whole or in part, are read by the processor 302, perhaps buffered within processor 302, and then executed.

When diagnosis system 100 is implemented in software, it should be noted that the diagnosis system can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. Diagnosis system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a computer-readable medium can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

Reference will now be made to the flowchart of FIG. 4, which depicts the functionality of a representative embodiment of diagnosis system 100. In this regard, each block of the flowchart represents a module segment or portion of code that comprises one or more executable instructions, or logic for implementing the specified logical function(s). It should also be noted that in some alternative implementations the functions noted in various blocks of FIG. 4, or any other of the accompanying flowcharts, may occur out of the order in which they are depicted. For example, two blocks shown in succession in FIG. 4 may, in fact, be executed substantially concurrently. In other embodiments, the blocks may sometimes be executed in the reverse order depending upon the functionality involved.

Figure 4:
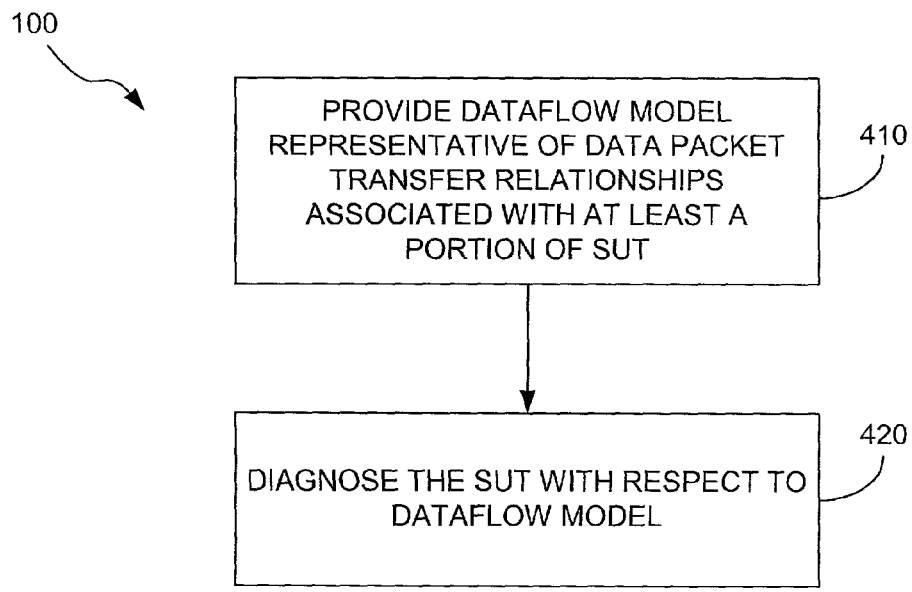
FIG. 4 is a flowchart depicting functionality of the embodiment of the diagnosis system of FIG. 3.

As shown in FIG. 4, the diagnosis system or method 100 may be construed as beginning at block 410, where a dataflow model representative of the SUT is provided. Preferably, the dataflow model includes information corresponding to data packet transfer relationships associated with at least a portion of the SUT. In block 420, the SUT is diagnosed with respect to the dataflow model. Typically, this includes acquiring test results, such as by using testing logic (see testing 100A of FIG. 3), and analyzing the test results with a reasoning engine (see reasoning 100C of FIG. 3). As mentioned before, the test results may be acquired by a separate system that provides the test results to the diagnosis system.

Typically, dataflow semantics embodied in a dataflow model are general in nature and can be applied to various systems. Typically, the dataflow model of a particular SUT is a directed graph that includes vertices and edges. A vertex represents the termination of an edge, i.e., vertices are used to define the ends of an edge. Additionally, a vertex can correspond to a location or portion of a data transmission path where data can be acted upon. By way of example, a vertex can correspond to a portion of a data transmission path that discards data that has been transmitted incorrectly, i.e., the vertex drops data packets, splits data into multiple portions, combines data, routes data and/or replicates data. By way of further example, a vertex can correspond to a location where measurements, e.g., counting of data, occur and/or where the goodness or badness of data can be determined, e.g., cyclical redundancy checks (CRC) can be performed. Note, tracking of data can include tracking data of a type(s) other than good and bad. Thus, embodiments of the invention may be adapted to account for other characteristics of data depending upon the particular application.

Edges represent data transmission paths or portions thereof through an SUT from one vertex to another. More specifically, edges are directional components that are considered opportunities for introduction of data transfer errors. For example, an edge (A, B) represents the conditional transfer of good or bad data, e.g., a data packet from vertex A to vertex B. A self-loop, e.g., (A, A), typically is not permitted.

With respect to an SUT, error-detection capabilities are associated with components that are adapted to perform checks to determine the integrity of data during and/or after operation, such as creation, storage, transmission and receipt. Such checks include cyclical redundancy checks (CRC) and message digesting methods, such as MD5. Clearly, this is applicable to those SUTs that incorporate packet-based architectures. For example, in such an SUT, data transmission integrity can be ensured by generating a CRC code at one location of the SUT, recalculating the CRC code at another location, and then comparing the two CRC codes.

By tracking data, such as by using error-detection capabilities, a portion or component of an SUT can acquire information regarding whether error-containing data, e.g., a bad data packet, has been received, has or is about to be transmitted, and/or whether bad data has been dropped or propagated downstream. Additionally, in some embodiments, the state of the components(s) and/or a time associated with error detection can be determined.

In some embodiments, the error-logging capability of the SUT is assumed to be perfect. That is, it is typically assumed that the SUT is able to log the correct status of incoming data at all edges, under all conditions. This, of course, is false in typical applications but can enable more efficient and higher resolution diagnosis to be performed. Clearly, additional variables could be used in some embodiments, such as to account for imperfect error-logging.

As mentioned before, diagnosis systems of the present invention use constraints to diagnose fault candidates of SUTs. More specifically, embodiments of the diagnosis system utilize the principle that data packet flow through the SUT is constrained according to the functionality of the SUT. This typically is represented as a dataflow graph of a particular test path. The SUT and dataflow graph also capture device status, counters, etc. Different reasoning engine functionality, however, can be used, and will be described later.

Regardless of the particular functionality, embodiments of the reasoning engine use the same definition of a diagnosis, i.e., the output of the reasoning engine. Additionally, the reasoning engines use test results including device status, packet counts, etc., and dataflow graphs describing the test path and associated device functionality, as input. Reasoning strategies produce a diagnosis as output that can include suspect edge(s) and the fault type(s)/quantities associated with each edge. For instance, an edge can be considered suspect if a fault on that edge is consistent with the test results. In contrast, an edge may not be considered suspect, i.e., good, if any failure on that edge is inconsistent with the test results. Good and suspect edges can then be mapped into physical components of the SUT as desired.

In this regard, embodiments of the reasoning engine of the invention can employ one or more techniques, such as, linear programming, rules-based and flow event-based fault simulation to apply the constraints. Embodiments of diagnosis systems that employ linear programming to evaluate SUTs typically use constraint equalities and/or inequalities, an example of each of which will be described later, to determine a diagnosis.

By way of example, linear programming can be used to find a feasible diagnosis given SUT functionality constraints and constraints associated with test, e.g., total number of attempted data, e.g., data packet transmissions and/or constraints associated with observed behavior (test results). In particular, in some embodiments, linear programming can be used to optimize/maximize the number of data packets made bad at each edge.

For instance, assume that a directed graph $G=(V,E)$ modeling the allowable flow of data, e.g., data packets, is provided. A vertex $v \epsilon V$ of G is a location where measurements may take place, the goodness or badness of packets may be tested, e.g., by checking a CRC code, and/or bad packets may be dropped, for example.

A vertex may be tagged with information about certain behavioral characteristics of the vertex. For instance, a "prop" vertex is a vertex that propagates bad packets and a "noprop" vertex is a vertex that drops any bad packets detected. Additionally, a "bus" vertex represents a physical bus, i.e., all good packets received are transmitted on all "out-edges" of such a vertex. "Unconstrained" vertices also can be used. No knowledge is available concerning the relationships between the number of packets received and the number of packets transmitted by this type of vertex. Such a vertex may be used to represent complex, data-dependent operations of the SUT, where the quantities of good and bad packets flowing into and out of the vertex are difficult to describe, for example.

Let $\Lambda$={prop, noprop, bus, unconstrained} be the set of possible vertex tags. Each vertex v prop$\epsilon$V has an associated set of tags given by the function $T: V \rightarrow 2^\Lambda$. The directed edges $E \subseteq V \times V$ are communications paths between vertices. Without loss of generality, only single direction edges, i.e., edges with only one arrow, typically are used. Otherwise, a bi-directional edge can be replaced with two single directional edges. Recall that the edges (j, i) $\epsilon$E are called the "in-edges" of i, and that the edges (i,j)$\epsilon$E are called the "out-edges" of i.

The following semantics of edges typically are assumed: a packet that flows into a vertex v from any of its in-edges may flow out any out-edge. If a system or test is known to restrict the flow of packets that enter a vertex v at a particular edge or edges to exit out of other particular edge or edges, then the vertex v should be broken into two or more vertices. Additionally, a vertex is called a "source" if it has no in-edges. It is called a "sink" if it has no out-edges.

In addition to the graph G, it its assumed that there is a set of counters $\Psi$ and a map M: $E \times \{t, r\} \times \{good, bad\} \rightarrow \Psi$. The map M gives the semantics of the counters. It should be interpreted as follows:

Suppose M ((i, j), t, good)=$\psi$. Then $\psi$ is incremented whenever a good packet is transmitted from vertex i onto edge (i, j).

Suppose M ((i, j), t, bad)=$\psi$. Then $\psi$ is incremented whenever a bad packet is transmitted from vertex i onto edge (i, j).

Suppose M ((i, j), r,good)=$\psi$. Then $\psi$ is incremented whenever a good packet is received by vertex j via edge (i, j).

Suppose M ((i, j), r, bad)=$\psi$. Then $\psi$ is incremented whenever a bad packet is received from vertex j via edge (i, j).

Note that a map M should be onto but may not be one-to-one. For example, suppose a vertex v has three in-edges (x, v), (y, v) and (z, v). It is desired to have $\psi$ count all good packets arriving at v. Then, set:

$M(((x, v),r, good))=M(((y, v), r, good))=M(((z, v)r, good))=\psi$

In like manner, a single counter can be used to count a wide variety of different events taking place at various edges. A set of particular measured values for each counter is called a syndrome.

The general premise of SUT diagnosis using linear programming is to encode available information, e.g., information regarding how packets are constrained, counter semantics, and measured counter values, into an optimization problem, the optimal solution of which determines whether a particular edge can be faulty.

In this regard, embodiments of a reasoning engine of a diagnosis system employing linear programming generally can be described as incorporating three subsections: (1) constraint extraction, (2) addition of syndrome constraints, and (3) determination of which fault candidates are possible given the constraints and syndrome. Typically, the first subsection can be precomputed for a given SUT. Additionally, only the second and third subsections typically need be re-run for each syndrome.

In regard to constraint extraction, a set of variables $U_{(i,j)\in E}\{g(i,j), b(i,j), mb(i,j), gd(i,j), bd(i,j)\}$ are created. The variable $g(i,j)$ represents the number of good packets transmitted onto edge $(i,j)$. The variable $b(i,j)$ represents the number of bad packets transmitted onto edge $(i,j)$ by vertex i. The variable $mb(i,j)$ represents the number of packets made bad on edge $(i,j)$, that is, packets transmitted onto the edge as good but received as bad. The variable $gd(i,j)$ represents the number of good packets transmitted onto edge $(i,j)$ that disappeared. Note, a packet can disappear when it becomes so corrupted that a receiving device cannot recognize the packet as a packet. The variable $bd(i,j)$ represents the number of bad packets transmitted on edge $(i,j)$ that disappeared.

Generally, an initially empty set of constraints C is created. For each vertex i with unconstrained $\not\in T(i)$ that has at least one in-edge and at least one out-edge, add to C from the constraints defined below, the constraint KG(i) if bus $\not\in T(i)$, the constraint KGB (i,j) for each out-edge j of i if bus $\in T(i)$.

For each vertex i with unconstrained $\not\in T(i)$ that has at least one out-edge, add to C, constraint KBP(i) if prop $\in T(i)$ and bus $\not\in T(i)$, the constraint KBPB (i,j) for each out-edge j of i if prop $\in T(i)$ and bus $\in T(i)$, a KBNP constraint if prop $\not\in T(i)$.

For each edge (i,j) $\in E$, add a constraint EDGECONSERVE (i,j).

For each counter $\psi\in\Psi$ add a constraint COUNTER ($\Psi$).

The constraints mentioned above are defined as follows:

KG(i)

(Kirchoff-like constraint on good packets, vertex not a bus):

$$\sum_{(k,i)\in E} g(k,i) - \sum_{(k,i)\in E} gd(k,i) - \sum_{(k,i)\in E} mb(k,i) - \sum_{(i,j)\in E} g(i,j) = 0$$

Constraint KG says that the number of good packets transmitted to vertex i less the number of packets that disappeared on i's in-edges less the number of packets made bad within i's in-edges must be equal to the number of good packets flowing out of i.

KGB (i,j)

(Kirchoff-like constraint on good packets, vertex is a bus):

$$\sum_{(k,i)\in E} g(k,i) - \sum_{(k,i)\in E} gd(k,i) - \sum_{(k,i)\in E} mb(k,i) - g(i,j) = 0$$

Constraint KG says the number of good packets transmitted to vertex i less the number of packets that disappeared on i's in-edges less number of packets made bad within i's in-edges must be equal to the number of good packets flowing out of out-edge j of i.

KBP(i)

(Kirchoff-like constraint on bad packets, prop vertex, vertex not a bus):

$$\sum_{(k,i)\in E} b(k,i) - \sum_{(k,i)\in E} bd(k,i) - \sum_{(k,i)\in E} mb(k,i) - \sum_{(i,j)\in E} b(i,j) = 0$$

Constraint KBP says that in a prop vertex i, the number of bad packets transmitted to i plus the number of packets that disappeared on i's in-edges plus the number of packets made bad within i's in-edges must be equal to the number of bad packets flowing out of i.

KBPB (i,j)

(Kirchoff-like constraint on bad packets, prop vertex, vertex is a bus):

$$\sum_{(k,i)\in E} b(k,i) - \sum_{(k,i)\in E} bd(k,i) + \sum_{(k,i)\in E} mb(k,i) - b(i,j) = 0$$

Constraint KBP says that in a prop vertex i, the number of bad packets transmitted to i less the number of packets that disappeared on i's in-edges plus the number of packets made bad within i's in-edges must be equal to the number of bad packets flowing out of each out-edge j of i.

KBNP (i)

(Kirchoff-like constraint on bad packets, noprop vertex):

$$\sum_{(i,j)\in E} b(j,i) = 0$$

Constraint KBNP says that no bad packets are transmitted from a nonprop vertex.

EDGECONSERVE (i,j)

(Conservation of packets on edges):

$$gd(i,j) + mb(i,j) g(i,j)$$

$$bd(i,j) b(i,j)$$

These inequalities relate that no more packets can disappear or be made bad on an edge than were transmitted on the edge. EDGECONSERVE constraints typically are necessary. Without them, solutions could be found where more packets disappear than were transmitted.

COUNTER($\psi$) (Specify the events that $\psi$ counts):

$$\sum_{M((i,j),t,good)=\psi} g(i,j) + \sum_{M((i,j),r,good)=\psi} (g(i,j) - gd(i,j) - mb(i,j)) +$$

-continued $$\sum_{M((i,j),t,bad)=\psi} b(i,j) + \sum_{M((i,j),r,bad)=\psi} (b(i,j) - bd(i,j) + mb(i,j)) = \text{counter\_value}(\psi)$$

Note, it also is typically necessary to constrain all variables to be nonnegative, i.e., there are no negative packet flows. Additionally, in some situations, it is desirable to constrain all or some variables to be integers.

Proceeding to the addition of syndrome constraints, a syndrome typically includes values associated with the various counters or various other observed SUT device status gathered after test execution. For each such counter, add an equality to C that specifies the value of the counter. For example, if the measured value of a counter associated with $\psi_{11}$ exhibits value 127 and a measured value of a counter associated with $\psi_{17}$ exhibits value 1001, add the constraints counter_value ($\psi_{11}$)=127 and counter_value ($\psi_{17}$)=1001. These syndrome constraints are referred to as S.

In regard to determination of possible fault candidates, the task is to determine which fault candidates could possibly have caused the bad packets detected, e.g., which fault candidates correctly account for the observed test results, such as counter values. Preferably, each fault candidate includes a fault type, e.g., mb, gd, bd, etc., and quantity of fault type, and corresponds to an associated edge $(i, j) \in E$.

For example, n packets may have transmitted incorrectly in a particular way on a particular edge, and more than one fault candidate may be associated with each edge. This set of fault candidates is called FC (i,j). In addition, the SUT may have more than one faulty edge, and more than one fault candidate may be associated with a given observed test result.

In this embodiment, a given fault candidate can be faulty if an only if there is a solution to the system of constraint equations where at least one or more of the associated fault variables is greater than 0. The constraints C and S are all linear. Since the variable values also typically are all integers, the constraint equations can be solved as an integer programming problem (IP).

Various routines can be used for solving IP problems. For instance, there are many library routines, such as lp_solve, that are available for solving IP problems. The source code for lp_solve is incorporated herein by reference. Note, in lp_solve, variables are nonnegative by default, so the variables do not need to be explicitly constrained as nonnegative. Additionally, lp_solve solves IP problems using the "Branch and Bound" method.

By selecting an objective function and iterating through multiple IP formulations using varying constraints, all the fault types can be efficiently enumerated for each possible faulty edge. In particular, the objective function typically is:

$$\max \sum_{(i,j)\in E} mb(i,j),$$

i.e., to maximize the sum of packets made bad on all edges in E. This function forces a solution to all fault variables such that every non-empty FC (i,j) contains at least one fault candidate. Note that a single optimization does not generate all members of every FC (i,j), but only a possibly large set of simultaneously satisfied FC(i,j). This objective function provides solutions to the fault variables where more than one edge may be faulty.

In order to generate additional fault candidates, the IP can be further constrained and additional optimizations can be run, such as in the following manner. For instance, let $$UFC1 = \bigcup_{(i,j)\in E} UFC(i,j)$$

and UFC=UFC1.

For every fc $\in$ UFC1:

1. Add to C a constraint setting that fault variable to 0, i.e., eliminating that fault type from future solutions. This effectively forces new fault types to emerge as solutions.

2. Optimize this new IP.

3. If a feasible solution exists, add one or more resulting unique fault candidates to UFC.

4. If a feasible solution does not exist, remove from C the constraint added in step 1.

The UFC should now contain a fault candidate of every feasible type for every possibly faulty edge. Note that for some IP solvers, in Step 1 it may be more efficient to remove a variable set to 0 from the problem by deleting all references to it in all of the constraints than to add a constraint requiring that it be zero.

In some applications, it may be desirable to enforce a number of simultaneous failures. For example, due to a priori knowledge or customer preference, a number of simultaneous defective edges may be enforced. Alternatively, following Occam's Razor, suppose it is desired to arrive at a diagnosis with a minimal number of defective edges. Such a diagnosis can be found by attempting first to find a single defective edge that explains the available data. Then, if none exists, then attempt to find a pair of effective edges that explain the available. This process can be continued until a multiple-defect hypothesis is found that explains the syndrome.

Case 1.

Figure 5:
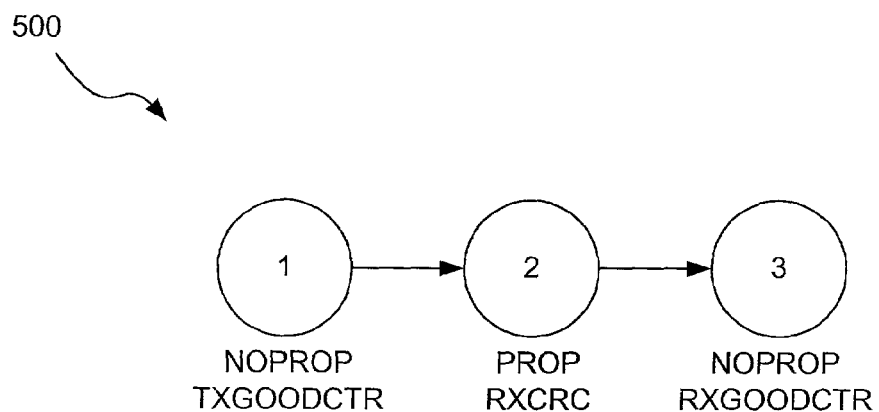
FIG. 5 is a directed graph representative of an embodiment of a dataflow model that can be used by a diagnosis system of the present invention.

Reference will now be made to the dataflow model of FIG. 5. Each vertex, e.g., vertex 1, vertex 2 and vertex 3, exhibits pre-defined behavioral characteristics. In particular, vertex 1 is capable of counting good packets transmitted, vertex 2 is capable of counting bad packets received, and vertex 3 is capable of counting good packets received. Additionally, both vertices 1 and 3 do not propagate received bad packets, and vertex 2 propagates received bad packets.

Based on dataflow model 500, three counters can be used: $\Psi=\{\psi_1, \psi_2, \psi_3\}$. The map M is given by $M((1, 2), t, \text{good})=\psi_1$ $M((1, 2), r, \text{bad})=\psi_2$ $M((2, 3), r, \text{good})=\psi_3$ The constraints C arising from dataflow model 500 are:

$b\_1\_2=0$; (*KBNP* on vertex 1)

$g\_1\_2-gd\_1\_2-mb\_1\_2-g\_2\_3=0$; (*KG* (2))

$b\_1\_2+bd\_1\_2=mb\_1\_1-b\_2\_3=0$; (*KBP*(2))

$g\_1\_2=psi\_1$; (COUNTER ($\psi_1$))

$b\_1\_2-bd\_1\_2+mb\_1\_2=psi\_2$; (COUNTER on ($\psi_2$))

$g\_2\_3-gd\_2\_3-mb\_2\_3=psi\_3$; (COUNTER on ($\psi_3$))

$gd\_1\_2+mb\_1\_2\ g\_1\_2$; (EDGECONSERVE (1, 2))

$bd\_1\_2 \leq b\_1\_2$; (EDGECONSERVE (1, 2))

$gd\_2\_3+mb\_2\_3 \leq g\_2\_3$; (EDGECONSERVE (2, 3))

$bd\_2\_3 \leq b\_2\_3$; (EDGECONSERVE (2, 3))

Assume that, based on acquired test results, vertex 1 counted 20 good packets, vertex 2 counted one CRC error, and vertex 3 counted 19 good packets. The constraints S arising from this syndrome are:

$psi\_1=20$ $psi\_2=1$ $psi\_3=19$

The integer program is max $\{mb\_1\_2+mb\_2\_3)|C, S\}$. The fault variables mb(1,2), gd(1,2), bd(1,2), mb(2,3), gd(2, 3), bd(2,3) are greater than or equal to 1 if an only if their corresponding edge can be faulty.

After solving the IP problem, such as described above, mb(1,2)=1 and all other fault variables are 0. Hence, the edge (1,2) is defective and one packet was made bad.

Case 2.

Figure 6:
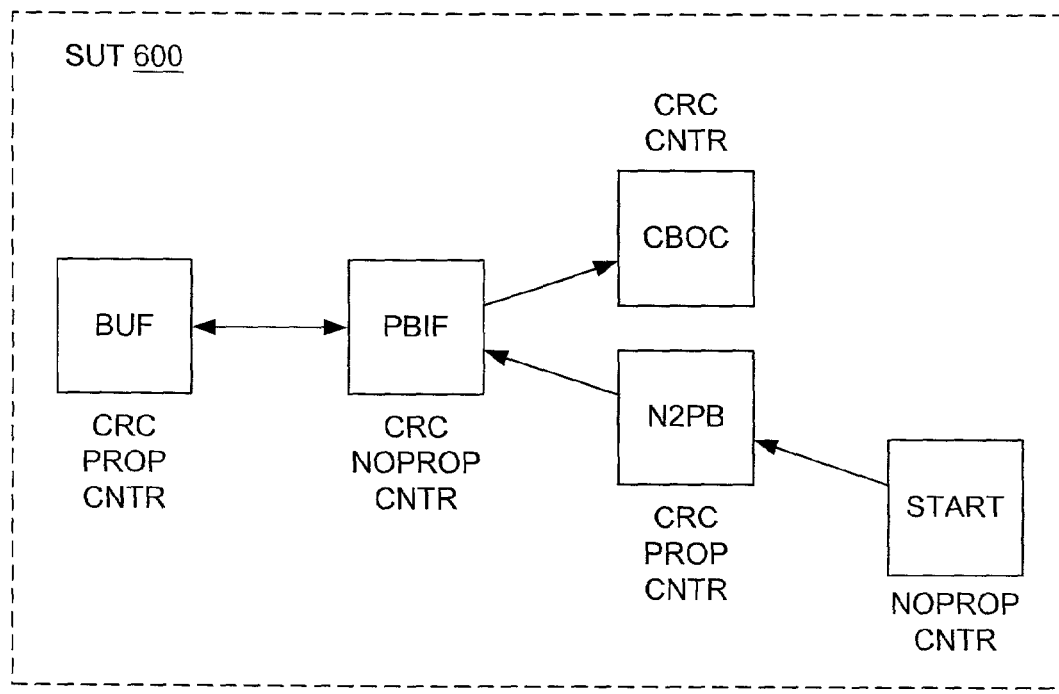
FIG. 6 is a block diagram depicting a representative system under test (SUT).

Reference will now be made FIG. 6, which depicts a block diagram of a representative SUT. As shown in FIG. 6, SUT 600 includes five components, i.e., START, N2PB, PBIF, BUF, and CBOC. Each component exhibits pre-defined behavioral characteristics. In particular, each of the depicted components of SUT 600 is capable of counting received data, e.g., data packets, and performing CRC checks. Additionally, it should be noted that several of the components perform differently with respect to each other when receiving bad data. More specifically, both N2PB and BUF propagate received bad data, and both START and PBIF do not propagate received bad data. Also, there are two different kinds of BUFF units. The "smart buff" counts good packets received, the "dumb buff" does not.

In the "dumb buff" case, four counters can be used: $\Psi=\{\psi_1, \psi_2, \psi_3, \psi_4\}$. The map M is given by:

$M((start, n2pb), t, good)=\psi_1$;

$M((start, n2pb), r, good)=\psi_2$;

$M((n2pb, pbif), r, good)=M((buff\ pbit), r, good)=\psi_3$; and $M((pbif, cboc), r, good)=\psi_4$.

Notice that two different arguments to M map to $\psi_3$. Thus, $\psi_3$ is incremented whenever a good packet is received by pbif on either of its in-edges, as desired. In the smart buff case, an additional counter $\psi_5$ typically is required and $M(pbif, buff), r, good)=\psi_5$.

Figure 7:
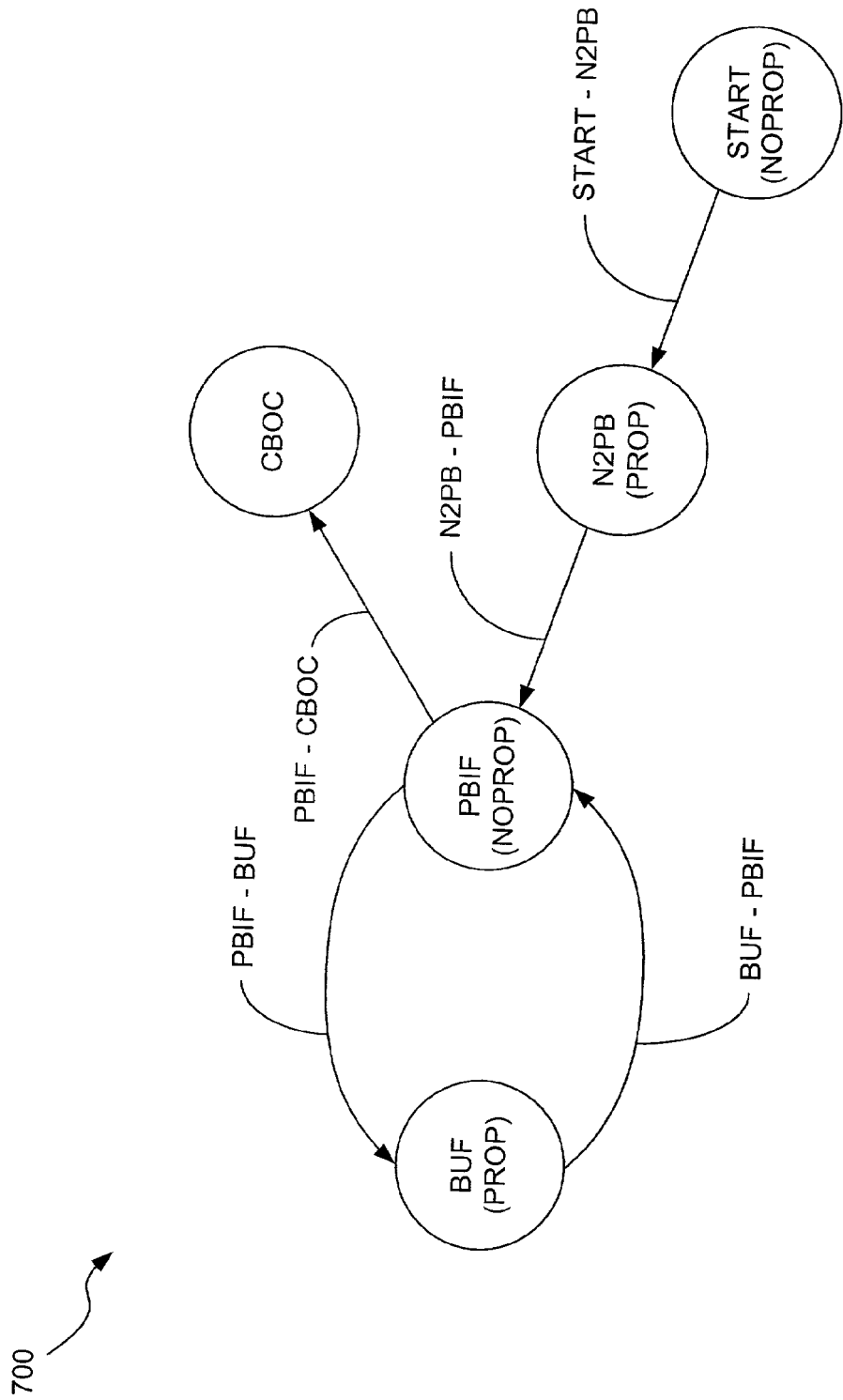
FIG. 7 is a directed graph representative of an embodiment of a dataflow model that can be used by a diagnosis system of the present invention to diagnose the SUT of FIG. 6.

Dataflow model 700 of FIG. 7 can be constructed based on the information presented regarding SUT 600 of FIG. 6. Note that the block diagram of FIG. 6 and the dataflow model 700 of FIG. 7 exhibit dataflow ambiguity. That is, each of the block diagram and the dataflow model 700 does not describe how data actually flows from PBIF to CBOC. In particular, it is ambiguous as to whether data arriving at PBIF first flows to BUF and back prior to being transferred to CBOC, or whether BUF is somehow bypassed. Because of this ambiguity, dataflow model 700, which provides direct analogues for the five components of the block diagram of FIG. 6, may be less useful than other dataflow models that do not incorporate such ambiguity. For instance, when information regarding the actual flow of data from PBIF to CBOC is acquired, an unambiguous dataflow model depicting the transfer of data through the SUT can be constructed. An embodiment of such a dataflow model will be described later with respect to FIG. 8.

Referring back to the dataflow model of FIG. 7, five syndromes were created, each of which is a possible syndrome arising from an intermittent failure of one of the five edges in the dataflow model. The syndromes are shown in Table 1.

TABLE 1

Syndromes used in Cases 1 and 2

| Counter defect | Syn. 1 start → n2pb | Syn. 2 n2pb → pbif | Syn. 3 pbif → buff | Syn. 4 buff → pbif | Syn. 5 pbif → cboc |
|---|---|---|---|---|---|
| $\psi_1$ | 10 | 10 | 10 | 10 | 10 |
| $\psi_2$ | 9 | 10 | 10 | 10 | 10 |
| $\psi_3$ | 18 | 18 | 19 | 19 | 20 |
| $\psi_4$ | 9 | 9 | 9 | 9 | 9 |
| $\psi_5$ | 9 | 9 | 9 | 10 | 10 |

The results of solving the linear programming problems are shown in Table 2 and Table 3. Recall that a nonzero entry implies that the corresponding fault hypothesis is a feasible failure cause. The value is the number of bad packets attributed to that failure cause.

TABLE 2

Results of LP solving for Case 2, dumb buffer.

| Fault Hypo. | Syn. 1 | Syn. 2 | Syn. 3 | Syn. 4 | Syn. 5 |
|---|---|---|---|---|---|
| start → n2pb | 1 | 0 | 0 | 0 | 0 |
| n2pb → pbif | 0 | 1 | 1 | 1 | 1 |
| pbif → buff | 0 | 1 | 1 | 1 | 1 |
| buff → pbif | 0 | 1 | 1 | 1 | 1 |
| pbif → cboc | 0 | 1 | 1 | 1 | 1 |

TABLE 3

Results of LP solving for Case 2, smart buffer.

| Fault Hypo. | Syn. 1 | Syn. 2 | Syn. 3 | Syn. 4 | Syn. 5 |
|---|---|---|---|---|---|
| start → n2pb | 1 | 0 | 0 | 0 | 0 |
| n2pb → pbif | 0 | 1 | 0 | 1 | 0 |
| pbif → buff | 0 | 0 | 1 | 0 | 1 |

TABLE 3-continued

Results of LP solving for Case 2, smart buffer.

| Fault Hypo. | Syn. 1 | Syn. 2 | Syn. 3 | Syn. 4 | Syn. 5 |
|---|---|---|---|---|---|
| buff → pbif | 0 | 1 | 0 | 1 | 0 |
| pbif ∝3 cboc | 0 | 0 | 1 | 0 | 1 |

Case 3.

In this example, another assumption is added to that described previously in relation to Case 2. In particular, suppose that an additional constraint is known, i.e., that packets must flow from n2pb to pbif to buff to pbif to cboc. Then, a more accurate dataflow model for the SUT can be constructed. Such a dataflow model is depicted in FIG. 8.

Figure 8:
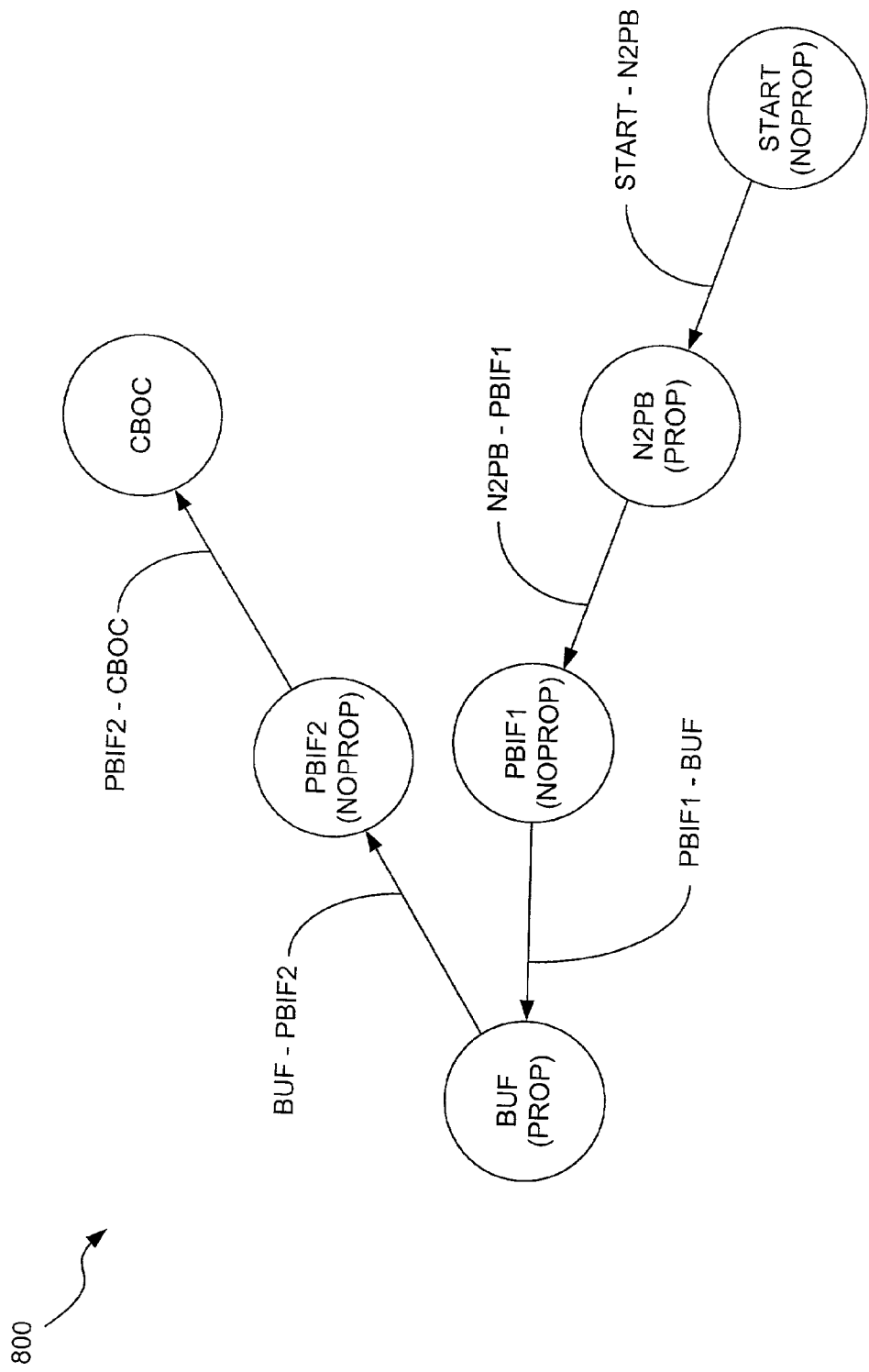
FIG. 8 is another directed graph representative of an embodiment of a dataflow model that can be used by a diagnosis system of the present invention to diagnose the SUT of FIG. 6.

As shown in FIG. 8, dataflow model 800 includes vertices START, N2PB, PBIF1, BUF, PBIF2 and CBOC. Edges START→N2PB, N2PB→PBIF1, PBIF→BUF, BUF→PBIF2, and PBIF2→CBOC are defined by the vertices. Thus, component IF of FIG. 6 has been redefined for the purpose of dataflow model 800 as two distinct vertices, i.e., PBIF1 and PBIF2, thereby removing the dataflow ambiguity.

As in Case 2, four counters can be used: $\Psi = \{\psi_1, \psi_2, \psi_3, \psi_4\}$. The map M is given by:

$M((start, n2pb), t, good) = \psi_1$ $M((start, n2pb), r, good) = \psi_2$, $M((n2pb, pbif1), r, good) = M((buff, pbif2), r, good) = \psi_3$, $M((pbif2, cboc), r, good) = \psi_4$.

In the smart buff case, an additional counter $\psi_5$ is required and $M((pbif1,buff)r,good) = \psi_5$. Note that $\psi_3$ is incremented when a good packet is received by either pbif1 or pbif2. This is because in the original dataflow model of FIG. 7, pbif counts all arriving good packets arriving on either edge.

The constraints C are:

$g\_start\_n2pb - gd\_start\_n2pb - mb\_start\_n2pb\_pbif1 = 0$;

$b\_start\_n2pb - bd\_start\_n2pb = mb\_start - b\_n2pb\_pbif1 = 0$;

$g\_n2pb\_pbif1 - gd\_n2pb\_pbif - mb\_n2pb\_pbif1 - g\_pbif1\_buff = 0$;

$b\_pbif1\_buff = 0$;

$g\_pbif1\_buff - gd\_pbif\_buff - mb\_pbif\_buff - g\_buff\_pbif2 = 0$;

$b\_pbif1\_buff - bd\_pbif1\_buff + mb\_pbif\_buff - b\_buff\_pbif2 = 0$;

$g\_buff\_pbif2 - gd\_buff\_pbif2 - mb\_buff - pbif2\_cboc = 0$;

$b\_pbif2\_cboc = 0$;

$gd\_start\_n2pb + mb\_start\_n2pb \leq g\_start\_n2pb$;

$bd\_start\_n2pb < b\_start\_n2pb$;

$gd\_2npb\_pbif1 + mb\_n2pb\_pbif \leq g\_n2pb\_pbif1$;

$bd\_n2pb\_pbif1 < b\_n2pb\_pbif1$;

$gd\_pbif1\_buff + mb\_pbif\_buff \leq g\_pbif1\_buff$;

$bd\_pbif1\_buff \leq b\_pbif1\_buff$;

$gd\_buff\_pbif2 + mb\_buff\_pbif \leq g\_buff\_pbif2$;

$bd\_biff\_pbif2 \leq b\_buff1\_pbif$;

$g\_start\_n2pb = psi\_1$;

$g\_start\_n2pb - gd\_start\_n2pb - mb\_start\_n2pb = psi\_2$;

$g\_n2pb\_pbif1 - gd\_n2pb\_pbif1 - mb\_n2pb\_pbif + g\_buff\_pbif2 - gd\_buff\_pbif2 - mb\_buff\_pbif = psi\_3$;

$g\_pbif2\_choc - gd\_pbif2\_choc - mb\_pbif\_choc = psi\_4$;

$g\_pbif1\_buff - gd\_pbif1\_buff - mb\_pbif\_buff = psi\_5$

The results of solving the LP problems appear in Tables 4 and 5. In this case, variables are additionally constrained to be integers.

TABLE 4

Results of LP solving for Case 3, dumb buffer.

| Fault Hypo. | Syn. 1 | Syn. 2 | Syn. 3 | Syn. 4 | Syn. 5 |
|---|---|---|---|---|---|
| start → n2pb | 1 | 0 | 0 | 0 | 0 |
| n2pb → pbif1 | 0 | 1 | 0 | 0 | 0 |
| pbif1 → buff | 0 | 0 | 1 | 1 | 0 |
| buff → pbif2 | 0 | 0 | 1 | 1 | 0 |
| pbif2 → cboc | 0 | 0 | 0 | 0 | 1 |

TABLE 5

Results of LP solving for Case 3, smart buffer.

| Fault Hypo. | Syn. 1 | Syn. 2 | Syn. 3 | Syn. 4 | Syn. 5 |
|---|---|---|---|---|---|
| start → n2pb | 1 | 0 | 0 | 0 | 0 |
| n2pb → pbif1 | 0 | 1 | 0 | 0 | 0 |
| pbif1 → buff | 0 | 0 | 1 | 0 | 0 |
| buff → pbif2 | 0 | 0 | 0 | 1 | 0 |
| pbif2 ∝3 cboc | 0 | 0 | 0 | 0 | 1 |

As mentioned before, embodiments of the diagnosis system can include reasoning engines that use various techniques for diagnosing faults. By way of example, algorithm or rule-based edge classification and edge classification through event-based fault simulation can be used.

With respect to rule-based edge classification, instead of processing graph and test constraints and a dataflow model into sets of equations for optimization (described before), the same information can be evaluated using rules. These rules can be adapted to classify edges of a dataflow model as good or suspect. In particular, rule-based edge classification could be implemented as an algorithm by a programming language, such as C or Prolog. As a further example, rule-based edge classification could be implemented through a constraint-based technology, such as CLP.

Typically, constraints are relevant according to graph G(V,E) and map M. For example, a bus vertex obeys certain flow constraints, such as given above; a nonprop vertex obeys certain constraints; all edges obey the EDGECONSERVE constraint and so forth. The constraints serve as a precise definition of the meaning of the dataflow graph, and are not dependent on the embodiment used to create a diagnosis.

The constraints associated with the vertices, edges, and counters are examined to order to determine diagnoses. Typically, each vertex has a relevant set of flow constraints as determined by lamba. Additionally, each edge typically includes an associated set of constraints describing the conservation of data packets over that edge, e.g., EDGE-CONSERVE. Furthermore, each counter typically includes a set of constraints defined by G, map M, and by the measured test results from the SUT.

In a rules-based embodiment, a linear program from the general constraints is not generally used, but instead, a graph independent algorithm is used to traverse G and apply the necessary constraints to in order to determine a diagnosis consistent with the SUT and test results.

Note, the general constraints may also be expressed as rules as input to a rules-processing engine along with G and map M. Such a rules-processing engine then traverses G, applies the constraints, and determines a diagnosis consistent with G, M, and the test results.

Referring back to the dataflow model 800 of FIG. 8 and the results of Syndrome 1 of Table 5, the information associated with dataflow model 800 and Syndrome 1 will now be analyzed using an exemplary rule-based edge classification technique.

Recall that five counters can be used in the smart buffer case: $\Psi = \{\psi_1, \psi_2, \psi_3, \psi_4, \psi_5\}$. The map M is given by:

$M((\text{start}, n2pb), t, \text{good}) = \psi_1$ $M((\text{start}, n2pb), r, \text{good}) = \psi_2,$ $M((n2pb, pbif1), r, \text{good}) = M((\text{buff } pbif2), r, \text{good}) = \psi_3,$ $M((pbif2, cboc), r, \text{good}) = \psi_4,$ and $M(pbif, \text{buff}), r, \text{good}) = \psi_5,$ and the counter values are: $\psi_1=10, \psi_2=9, \psi_3=18, \psi_4=9,$ and $\psi_5=9$.

Beginning the analysis with edge start→n2pb, it can be determined that counters 1 and 2 contain information corresponding to this edge. In particular, counter 1 contains information regarding the number of good packets transmitted onto the edge, and counter 2 contains information regarding the number of good packets received from the edge. Note, with respect to any edge, if the number of good packets transmitted to the edge equals the number of good packets received from the edge, the edge is not suspect. However, with respect to edge start→n2pb, the number of good packets received from that edge does not equal the number of good packets transmitted to that edge, i.e., counter 1–counter 2=1. Recalling that the number of good packets received from an edge equals the number of good packets transmitted to the edge minus the number of good packets transmitted on the edge that disappeared minus the number of good packets made bad on the edge. Therefore, 2−gd−mb=1 or, since only integers are used, either mb(start, n2pb) or gd(start,n2pb) equal 1.

With respect to edge n2pb−pbif1, counters 2 and 3 are relevant. Recalling that counter 3 counts all the good packets received at pbif1 and pbif2, during fault free operation, counter 3 should contain a value that is twice as large as the counter value of counter 2. Application of this rule reveals that counter 3's value is two times as large as the value counter 2, therefore, edge n2pb pbif1 should not be suspect.

This is another application of the counter rule that states that the number of good packets received from an edge equals the number of good packets transmitted to the edge minus the number of good packets disappearing on the edge minus the number of good packets made bad on the edge. More specifically, since it is known that 18 packets were received good at counter 3 and counter 3 can only be as great as twice that of the value of counter 2, the operation of edge n2pb, pbif1 must have been error free. Note, the remaining edges could be classified in similar manner as would be apparent to one of skill in the art.

As mentioned before, edge classification through flow event-based fault simulation also can be used to provide a diagnosis. In particular, a dataflow graph, associated constraints, and fault model can be used to construct a behavioral model. Flow event-based fault simulation of this behavioral model then can be conducted with respect to an intermittent fault model, with the results being stored in a fault dictionary. This fault dictionary can provide a mapping between test results and associated diagnoses for intermittent failures in packet devices.

While behavioral models and associated simulators and fault simulators exist for some analog and digital circuits, these cannot be practically used to create a diagnosis of intermittent faults of complex packet architecture devices, such as routers. This is because such behavioral models and simulators employ a bit-by-bit description of test stimulus for a complex SUT operating on millions of packets, and thus, are not commercially practical.

Embodiments of the reasoning engine that use flow event-based fault simulation use behavioral models that operationally represent the elements, e.g., edges and vertices, of a dataflow graph. The resulting part-, board- or system level model can be practically developed and fault simulated to produce a fault dictionary and, therefore, a diagnosis for intermittent faults in packet devices.

The logical process of fault simulation, in general, is to simulate an inserted fault, apply a description of test stimulus to the device, and observe the device response under the inserted fault condition. A fault dictionary then records the correspondence of the inserted fault to observable result. The process is repeated for each fault type in the fault model.

In contrast to conventional fault simulation, the test stimulus provided by embodiments of the reasoning engine does not represent the actual input to the device in the form of 1's and 0's. In particular, the test stimulus used is a model or abstraction of the inputs, e.g., the number of packets and their type. Additionally, events corresponding to SUT operation are simulated. As another point of distinction, embodiments of the reasoning engine can use fault models for intermittent failures.

Since flow-significant results, e.g., number or packets, packet type, contents of internal counters or other state, are of interest, efficiencies can be achieved by not having to allocate resources to track bit-level activity of a system. A given flow-significant test result can be compared with simulated test results. If the results match, then the simulated fault(s) that correspond to the simulated test results can be determined by consulting the fault dictionary.

The following is a general description of an embodiment of a reasoning engine that uses event-based fault simulation. First, an embodiment of the behavioral model will be described. For example, a corresponding behavioral model for a bus vertex takes every packet-received event on any of its in-edges and produces a packet transmitted even on all out-edges. This replication includes reproducing an event indicating a packet was transmitted onto each out-edge. If the bus vertex required dropping bad packets (noprop member T(i)), then any incoming bad packet arrival event would be discarded.

With respect to a non-bus, prop vertex with multiple out-edges, every packet arrival event is reproduced on some edge, but no necessarily all edges. The associated behavioral model implements this by non-deterministically producing a packet-transmitted event on one and only one out-edge. In a similar manner, a mapping exists between all vertex types and T(i) to an associated behavioral model that operates according to the constraints associated with the vertex and its properties.

Additionally, for each test, each source vertex can provide a given number of packets of a given type. This is realized as a behavioral model that produces the associated number of packet transmitted events onto its out-edge(s). With respect to a sink, every sink vertex produces no new events because it has no out-edges.

Edge constraints are mapped to behavioral models too. The edge model converts packet transmitted events to packet arrived events for the destination vertex or associated counter model. Under fault simulation conditions, the edge can convert packet transmitted events into bad packet arrived events, or good packet disappeared events, etc., according to the fault model.

Counter constraints also are represented as behavioral models. Recall that map M associates a counter with a packet type (good/bad) and an event (packet tx, packet rx) with an edge. Packet tx is the same as packet transmitted, packet rx is packet received. A given counter monitors its associated edge(s) for relevant events. When a relevant event occurs, the counter is incremented.

Event-Based Fault Simulation—Example 1 (Single Good Packet Simulation)

According to the test design, the start vertex will source 10 good packet transmitted events onto edge (start,n2pb) over the course of the test. The chain events through the simulation of one packet is as follows:

1. start signals packet 1 transmitted onto (start,n2pb);
2. counter $\psi_1$, sees its relevant event (good packet transmitted onto (start, n2pb)) and increments itself;
3. edge (start, n2pb) sees the packet-transmitted-onto event and converts it to a packet-received-from event for edge (start, n2pb);
4. counter $\psi_2$ sees its relevant event (good packet received from (start, n2pb)) and increments itself;
5. vertex n2pb sees a good packet received from (start, n2pb) and produces a good packet transmitted onto (n2pb, pbif);
6. edge (n2pb, pbif) sees a good-packet-transmitted-onto event and converts it to good-packet-received-from event;
7. counter $\psi_3$ sees its relevant event and increments itself;
8. node pbif sees a good-packet-received-from event and produces a good-packet-transmitted-onto (pbif, cboc). For a subsequent packet, pbif may choose to signal (pbif, buff) instead; however, it cannot signal an event for both edges, by definition;
9. edge (pbif, cboc) then sees a good-packet-transmitted-onto event and converts it to a good-packet-received-from event;
10. counter $\psi_4$ then sees a good-packet-received-from event and increments itself;
11. Then, sink node cboc creates no further events, as the life of this packet is complete.

At the end of the good SUT simulation of all 10 packets sources, $\psi_1=10$, $\psi_2=10$, $\psi_3=20$, $\psi_4=10$.

Event-Based Fault Simulation—Example 2 (Single Bad Packet Fault Simulation)

The 10 packets are sources as in the previous example. However, one of the 10 packets is corrupted on (n2pb, pbif). The iteration of the flow-event based fault simulation is as follows. Note, the fault simulator decides to insert the fault event one good packet made bad on edge (n2pb, pbif).

1. start signals packet 1 transmitted onto (start, n2pb);
2. counter $\psi_1$ sees its relevant event (good packet transmitted onto (start, n2pb)) and increments itself;
3. edge (n2pb, pbiff) recognizes its relevant fault event "one good packet made bad" and converts the packet-transmitted-onto-event into a bad-packet-received-from event for (n2pb, pbif);
4. counter $\psi_2$ does not see its relevant event (good packet received from (start, n2pb)) and, therefore, does not increment itself;
5. vertex n2pb then sees a bad packet received from (n2pb, pbif) and discards the event because pbif, by model definition, does not propagate bad packets;
6. the fault simulation simulates the transmission of the remaining 9 good packets without including another fault event.

The resulting counts are $\psi_1=10$, $\psi_2=10$, $\psi_3=18$, and $\psi_4=9$. The associated fault dictionary entry includes this information and the fault event that gave rise to it. If test results from the SUT match this entry in the fault dictionary, the diagnosis is good packet made bad on (n2pb, pbif). It is worth noting that a subsequent simulation of the event "one packet made bade" on (buff, pbif) produces the same simulated results. In this case, the diagnosis includes both fault events since both may be a reasonable explanation of the results.

The above process can be repeated for each of the fault types on each of the edges. Quantities of fault events per edge may be varied and the number of simultaneous edge faults may also be varied according to the needs of the application. The number of iterations of the fault simulator can be adjusted to compensate for non-determinism in packet flow as indicated by the definition of the vertices. This results in producing fault dictionary entries for the various ways in which the SUT might perform.

The foregoing description has been presented for purposes of illustration and description. It is not intended to be exhaustive or to limit the invention to the precise forms disclosed. Modifications and/or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variations are within the scope of the invention as determined by the appended claims.

The invention claimed is:

1. A method for diagnosing data packet transfer faults in a system under test (SUT), the SUT defining data transmission paths through which data packets are transferred, said method comprising:

identifying at least some portions of the data transmission paths of the SUT capable of introducing errors in data packet transfer;

providing constraints defining data packet transfer relationships of at least some of the portions of the data transmission paths identified;

receiving test results corresponding to the SUT; and diagnosing the SUT with respect to the constraints by analyzing the test results with respect to a dataflow model comprising a directed graph embodying error-free behavior of the SUT;

wherein test stimulus used as input for diagnosing the SUT is a model representative of actual input applied to the SUT during operation.

2. The method of claim 1, the dataflow model includes edges and vertices, each of the edges corresponding to a portion of one of the data transmission paths of the SUT capable of introducing errors in data transfer, each of the edges being defined between two of the vertices, each of the vertices being at least one of a termination of an edge and representative of a location where an operation with respect to data packets can occur.

3. The method of claim 2, wherein the operation corresponding to a vertex includes at least one of dropping data, splitting data, routing data, replicating data, combining data, counting data, and identifying a type of data.

4. The method of claim 2, wherein the SUT includes counters corresponding to at least some of the edges of the dataflow model, each of the counters being associated with at least one of the vertices; and further comprising:

receiving information corresponding to the test results from at least some of the counters.

5. The method of claim 2, wherein analyzing the test results comprises:

identifying a fault type associated with a failed data transfer.

6. The method of claim 2, wherein analyzing the test results comprises:

receiving information corresponding to failed data transfers; and identifying portions of the SUT potentially associated with the failed data transfers.

7. The method of claim 6, wherein analyzing the test results comprises:

exonerating portions of the SUT initially identified as being associated with the failed data transfers if those portions of the SUT are determined not to have initiated at least one of the failed data transfers.

8. The method of claim 6, wherein identifying comprises identifying the failed data transfers using a rules-based edge classification technique that uses a graph independent algorithm to traverse the constraints and apply at least some of the constraints to determine a diagnosis.

9. The method of claim 6, wherein identifying comprises identifying the failed data transfers using a flow event-based fault simulation technique that uses behavior models representing portions of the SUT to construct a fault dictionary.

10. The method of claim 6, wherein identifying comprises identifying the failed data transfers using linear programming.

11. The method of claim 10, wherein the linear programming is Integer Programming.

12. A system for diagnosing data packet transfer faults in a system under test (SUT), said system comprising:

a dataflow model representative of at least some portions of data transmission paths of the SUT, the dataflow model comprising a directed graph embodying error-free behavior of the SUT; and a reasoning engine associated with said dataflow model, said reasoning engine being adapted to evaluate test results corresponding to the SUT in relation to said dataflow model, wherein the test results are obtained in response to test stimulus provided by the reasoning engine, the test stimulus being a model of inputs applied to the SUT during operation.

13. The system of claim 12, wherein said dataflow model comprises edges and vertices, each of said edges corresponding to at least a portion of a data transmission path of the SUT through which an error can be introduced, each of said edges being defined by two of said vertices.

14. The system of claim 12, wherein said reasoning engine is adapted to evaluate the test results of the SUT with respect to constraints, the constraints defining relationships of at least some of the portions of the dataflow model.

15. The system of claim 14, wherein the reasoning engine identifies the failed data transfers using a rules-based edge classification technique that uses a graph independent algorithm to traverse the constraints and apply at least some of the constraints to determine a diagnosis.

16. The method of claim 14, wherein the reasoning engine identifies the failed data transfers using an event-based fault simulation technique that uses behavior models representing portions of the SUT to construct a fault dictionary.

17. The system of claim 14, wherein the reasoning engine identifies comprises identifying the failed data transfers using linear programming.

18. The system of claim 17, wherein the linear programming is Integer Programming.

19. The system of claim 12, wherein said reasoning engine is adapted to receive information corresponding to failed data transfers and identify portions of the SUT potentially associated with the failed data transfers.

20. A diagnosis system stored on a computer-readable medium, the diagnosis system being adapted to diagnose data packet transfer faults in a system under test (SUT), said diagnosis system comprising:

logic configured to identify at least some portions of data transmission paths of the SUT capable of introducing errors in data packet transfer;

logic configured to provide constraints defining data packet transfer relationships of at least some of the portions of the data transmission paths;

logic configured to receive test results corresponding to the SUT; and logic configured to diagnose the SUT with respect to the constraints by analyzing the test results with respect to a dataflow model comprising a directed graph embodying error-free behavior of the SUT;

wherein test stimulus used as input for diagnosing the SUT is a model representative of actual input applied to the SUT during operation.

21. The diagnosis system of claim 20, wherein said logic configured to diagnose includes logic configured to generate information indicative of the flow of data associated with a time of error detection.

22. The diagnosis system of claim 20, wherein said logic configured to diagnose includes logic configured to identify portions of the SUT potentially associated with failed data transfers.

23. The diagnosis system of claim 22, wherein said logic configured to diagnose includes logic configured to exonerate components initially identified as being associated with the failed data transfers.

* * * * *